(12) United States Patent
Jiang

(10) Patent No.: US 9,746,011 B2
(45) Date of Patent: Aug. 29, 2017

(54) BEAM CLAMP

(71) Applicant: Jiangmen Eurofix Metal and Rubber Products Co., Ltd., Jiangmen, Guangdong Province (CN)

(72) Inventor: Shizhong Jiang, Jiangmen (CN)

(73) Assignee: Jiangmen Eurofix Metal and Rubber Products Co., Ltd., Jiangmen (CN)

( * ) Notice: Subject to any disclaimer, the term of this patent is extended or adjusted under 35 U.S.C. 154(b) by 52 days.

(21) Appl. No.: 14/753,083

(22) Filed: Jun. 29, 2015

(65) Prior Publication Data

US 2016/0377101 A1    Dec. 29, 2016

(51) Int. Cl.
*F16L 3/24*    (2006.01)
*F16B 2/06*    (2006.01)

(52) U.S. Cl.
CPC .................... *F16B 2/065* (2013.01)

(58) Field of Classification Search
CPC . B25B 5/101; B25B 1/103; F16L 3/24; Y10T 24/44265
See application file for complete search history.

(56) References Cited

U.S. PATENT DOCUMENTS

| | | | | |
|---|---|---|---|---|
| 1,470,642 A | * | 10/1923 | Ready ..................... | F16L 3/24 104/111 |
| 1,804,007 A | * | 5/1931 | Golnick .................. | B25B 5/101 269/182 |
| 2,470,992 A | * | 5/1949 | Kindorf ................... | F16L 3/24 248/72 |
| 2,562,562 A | * | 7/1951 | Manasek .................. | F16L 3/24 248/230.2 |
| 2,642,243 A | * | 6/1953 | Kindorf ................... | F16L 3/24 248/228.6 |
| 2,659,561 A | * | 11/1953 | Kindorf .................. | B25B 5/101 248/228.6 |
| 2,678,786 A | * | 5/1954 | Kindorf ................... | F16L 3/24 24/335 |
| 3,341,909 A | * | 9/1967 | Havener ................. | B25B 5/101 24/350 |
| 3,572,623 A | * | 3/1971 | Lapp ........................ | F16L 3/24 248/72 |
| D226,800 S | * | 5/1973 | Rumble ........................ | D8/394 |
| D226,801 S | * | 5/1973 | Rumble ........................ | D8/394 |
| D237,775 S | * | 11/1975 | Hitomi ......................... | D8/356 |
| D242,113 S | * | 11/1976 | Mooney et al. ............... | D8/394 |

(Continued)

*Primary Examiner* — Bradley Duckworth
(74) *Attorney, Agent, or Firm* — Dority & Manning, P.A.

(57) ABSTRACT

A beam clamp, including a clamp body having a rectangular shape symmetrically bent and butt-jointed by a plate material is described. On one side of the body housing a butt seam is a butt-joint face, and clamping jaws are protruded on the two sides of the body at the two sides of the butt-joint face. A clamping plate face is convexly disposed on one side of the body opposite the butt-joint face, and a screw hole corresponding to the clamping jaw is bored on the plate face. The screw hole is tapped and a bolt is disposed therein. The bolt and jaws form three-point clamping, providing high fastening performance. Corresponding threaded rod holes are bored on the plate face and butt-joint face and tapped. The resulting clamp has high processing precision, efficiency, and adaptability; the structure strength is high; load performance is good; and the size is small.

7 Claims, 2 Drawing Sheets

(56) References Cited

U.S. PATENT DOCUMENTS

| | | | | |
|---|---|---|---|---|
| D267,625 S | * | 1/1983 | Dark | D8/72 |
| 4,570,885 A | * | 2/1986 | Heath | B21D 53/36 248/72 |
| D337,934 S | * | 8/1993 | Young | D8/355 |
| 5,586,373 A | * | 12/1996 | Eby | B25B 1/103 24/525 |
| 6,971,642 B2 | * | 12/2005 | Carnell | B25B 5/101 269/143 |
| 7,431,252 B2 | * | 10/2008 | Birli | F16B 2/065 248/221.11 |
| 7,469,903 B2 | * | 12/2008 | Marshall | F41J 1/10 24/469 |
| 7,597,291 B2 | * | 10/2009 | Hoffmann | E04B 9/18 248/689 |
| 7,614,590 B2 | * | 11/2009 | Boville | E04B 9/20 248/214 |
| 8,132,767 B2 | * | 3/2012 | Oh | F16B 2/065 248/214 |
| 8,534,625 B2 | * | 9/2013 | Heath | F16B 2/065 138/106 |
| D711,718 S | * | 8/2014 | Francaviglia | D13/149 |
| 8,857,771 B2 | * | 10/2014 | Streetman | F16L 3/133 248/228.1 |
| 8,882,056 B2 | * | 11/2014 | Greenfield | F16L 3/24 248/228.6 |
| D733,267 S | * | 6/2015 | McCarter | D23/265 |
| D767,983 S | * | 10/2016 | Jiang | D8/394 |

\* cited by examiner

BEAM CLAMP

FIELD OF THE INVENTION

The present invention relates to a clamp, and in particular, to a beam clamp.

BACKGROUND OF THE INVENTION

A beam clamp refers to a clamp that is clamped, such as, on a beam in a workshop. The existing beam clamp usually adopts two claws to clamp edges at the two sides of a beam body, and uses bolts to fasten the claw positions, thus fixing the beam clamp on the beam, and then being capable of realizing other support and fixation effects through the clamp. However, this clamp requires that the edges at the two sides of the beam shall be provided with edge for clamping, for example, an "I" beam, and cannot be applied to a beam only having a single-side protruded edge. Therefore, it needs a better beam clamp structure which not only can realize single-side clamping and fixation, but also can ensure to provide enough support strength, and can bear weight during long-term high-load application.

SUMMARY OF THE INVENTION

In order to overcome the defects of the prior art, the present invention provides a beam clamp that can be firmly clamped and fixed on a beam at a single side.

To solve the technical problem, the present invention employs a technical solution as follows:

A beam clamp includes a clamp body, wherein the clamp body is a rectangular tube body shape symmetrically bent and butt-jointed by a plate material. One side of the clamp body housing butt seam is a butt-joint face, symmetrical clamping jaws are protruded on the two sides of the clamp body at the two sides of the butt-joint face. A clamping plate face is convexly disposed on one side of the clamp body opposite to the butt-joint face, a screw hole corresponding to the clamping jaw is laser bored on the clamping plate face, and then the screw hole is tapped. A bolt is disposed in the screw hole, and the bolt and the clamping jaws form three-point clamping, and corresponding threaded rod holes are laser bored consistently on the clamping plate face and the butt-joint face, and then the threaded rod holes are tapped.

As an improvement of the foregoing technical solution, the plates are stamped firstly before the laser boring of the screw hole, and after the laser boring, the screw hole forms a convex wall at one side internal to the clamp body.

As an improvement of the foregoing technical solution, side plates are extended out from the edges at the two sides of the clamping plate face along the clamp body, and the cross section of the clamping plate face is C-shaped.

Further, the clamping jaw is wedge-shaped, and one side of the clamping jaw corresponding to the clamping plate face is provided with a plurality of teeth.

Further, a lock nut configured to lock the bolt is correspondingly disposed on the bolt, the lock bolt being located outside the clamp body.

The present invention has the advantages that: according to the product, the plate material is bent and butt-jointed to form the beam clamp body, and holes are accurately laser bored; therefore, the processing precision and efficiency are very high; moreover, three-point clamping is applied on the clamping jaws and the bolt, thus having a very high fastening performance; meanwhile, the entire structure strength is high, the load performance is good, the size is small, and the beam clamp has a good adaptability.

BRIEF DESCRIPTION OF THE DRAWINGS

The present invention will be further described in details hereinafter with reference to the drawings and embodiments.

DETAILED DESCRIPTION OF THE EMBODIMENTS

Figure 1:
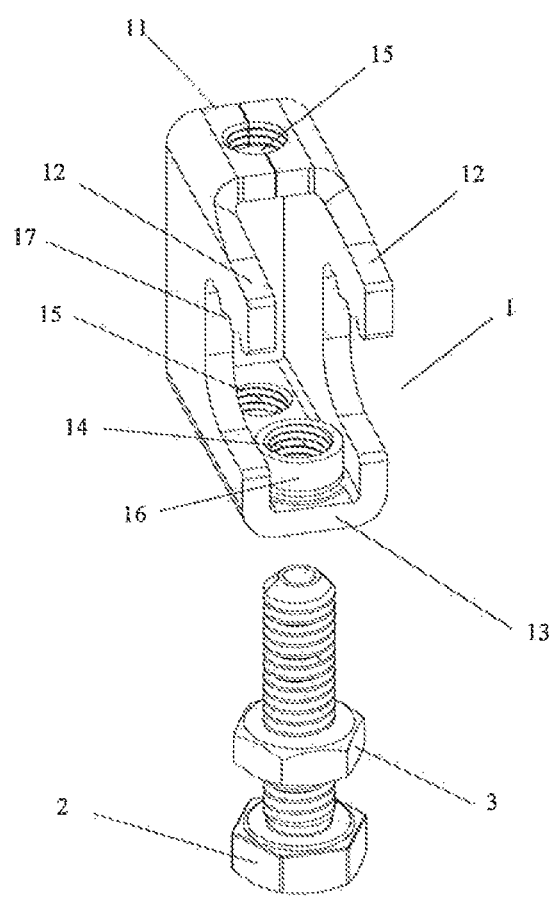
FIG. 1 is an exploded schematic view of an installation structure of the present invention.
Figure 2:
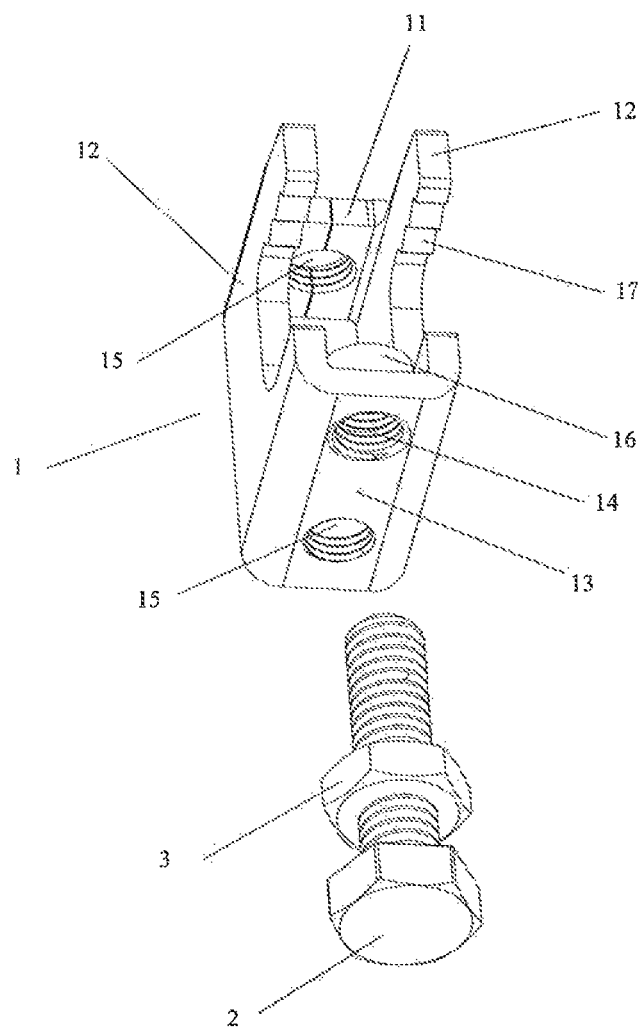
FIG. 2 is an exploded schematic view of an installation structure of the present invention from another angle.

Referring to FIG. 1 and FIG. 2, a beam clamp includes a clamp body 1, wherein the clamp body 1 is a rectangular tube body shape symmetrically bent and butt-jointed by a plate material. One side of the clamp body 1 housing a butt seam is a butt-joint face 11, the butt seam is located in the middle of the butt-joint face 11, and symmetrical clamping jaws 12 are protruded on the two sides of the clamp body 1 at the two sides of the butt-joint face 11. A clamping plate face 13 is convexly disposed on one side of the clamp body 1 opposite to the butt-joint face 11, the clamping jaws 12 and the clamping plate face 13 form an arched clamping opening, for adapting to enclose the edge of the beam. A screw hole 14 corresponding to the clamping jaw 12 is laser bored on the clamping plate face 13, the processing efficiency of the laser boring is very high and the precision thereof is also very high, The screw hole 14 is correspondingly between the two clamping jaws 12, and then the screw hole 14 is tapped, moreover, a bolt 2 is disposed in the screw hole 14; therefore the bolt 2 together with the clamping jaws 12 form a three-point clamping manner. Through rotating the bolt 2, the bolt 2 and the clamping jaws 12 are easily controlled to clamp or loosen. Corresponding threaded rod holes 15 are laser bored consistently on the clamping plate face 13 and the butt-joint face 11, and then the threaded rod holes 15 are tapped. A threaded rod can be accurately, vertically, and suitably penetrated into the two threaded rod holes 15. The beam clamp after being fastened and clamped on the beam loads through a suspension ring disposed on the threaded rod or through other structures. The butt seam does not need stitching, the two sides of the clamp body 1 are main force-bearing parts, and only bear a longitudinal force; moreover, the threaded rod holes also provide a longitudinal supporting force through a screw thread matching.

As an improvement of the above embodiment, the plate is stamped firstly before the laser boring of the screw hole 14, and after the laser boring, the screw hole 14 forms a convex wall 16 at one side internal to the clamp body 1. Through the wall 16, the contact area between the screw hole 14 and the bolt 2 is extended, while the straightness of the bolt 2 during moving and force-bearing is maintained.

As an improvement of the foregoing embodiment, side plates are extended out from the edges at the two sides of the clamping plate face 13 along the clamp body 1, and the cross section of the clamping plate face 13 is C-shaped, thus improving the torsional rigidity and supporting strength of the clamping plate face 13.

Further, the clamping jaw 12 is wedge-shaped, and one side of the clamping jaw 12 corresponding to the clamping plate face 13 is provided with a plurality of teeth 17, wherein the teeth 17 effectively increases the clamping frictional force of the clamping jaw 12.

Further, a lock nut 3 configured to lock the bolt 2 is correspondingly disposed on the bolt, wherein the nut can lock the position of the bolt 2 to prevent the bolt from being loosened due to external force, which makes the beam clamp fail to clamp; moreover, the lock nut 3 is located outside the clamp body 1, which is also convenient to operate when being installed and used.

The above disclosed is merely preferred embodiments of the present invention, but the present invention is not limited to the foregoing embodiments. Any technical effect of the present invention achieved with any same or similar means shall all fall within the protection scope of the present invention.

What is claimed is:

1. A beam clamp comprising:
   a clamp body being formed from a plate material symmetrically bent and butt-jointed in the form of a rectangular tube body,
   a butt-joint face being disposed at one side of the clamp body where a butt seam is housed,
   symmetrical clamping jaws that protrude along the clamp body on two sides of the clamp body, wherein the symmetrical clamping jaws are disposed at two sides of the butt-joint face,
   a clamping plate face being convexly disposed on one side of the clamp body opposite to the butt-joint face,
   a screw hole corresponding to the clamping jaws, wherein the screw hole is disposed on the clamping plate face, wherein a convex wall extends from the screw hole towards the butt joint face,
   a bolt being disposed in the screw hole for forming three-point clamping with the clamping jaws, and
   corresponding threaded rod holes on the clamping plate face and the butt-joint face, wherein the threaded rod hole on the butt-joint face intersects with the butt seam on the butt-joint face,
   wherein side plates are extended out from edges at two sides of the clamping plate face along the clamp body, and the cross section of the clamping plate face is C-shaped, and
   wherein a lock nut configured to lock the bolt is correspondingly disposed on the bolt, the lock nut being located outside the clamp body.

2. The beam clamp according to claim 1, wherein the clamping jaws are wedge-shaped, and one side of each clamping jaw facing the clamping plate face is provided with a plurality of teeth.

3. A method for making the beam clamp according to claim 1, the method comprising the steps of:
   boring a first hole with lasers on the clamping plate face;
   stamping the plate material at the first hole; and
   tapping the first hole to form the screw hole.

4. The method according to claim 3, comprising the steps of boring a second hole with lasers on the clamping plate face and a third hole with lasers on the butt-joint face, respectively, and tapping the second hole and the third hole to form the threaded rod holes.

5. The method according to claim 3, wherein side plates are extended out from edges at two sides of the clamping plate face along the clamp body, wherein a cross-section of the clamping plate face is C-shaped.

6. The method according to claim 3, wherein the clamping jaws are wedge-shaped and one side of each clamping jaw facing the clamping plate face is provided with a plurality of teeth.

7. The method according to claim 3, wherein a lock nut configured to lock the bolt is correspondingly disposed on the bolt, the lock nut being located outside the clamp body.

* * * * *